United States Patent

Segal et al.

[11] Patent Number: 4,703,111
[45] Date of Patent: Oct. 27, 1987

[54] WATER-SOLUBLE COMPOUNDS CONTAINING ONE OR TWO (NITROPHENYLAMINO)-PHENYLAMINO-CHLOROTRIAZINYLAMINO GROUPS, THE NITROPHENYLAMINO BEING ADDITIONALLY SUBSTITUTED BY A FIBER-REACTIVE GROUP OF THE VINYLSULFONYL SERIES, SUITABLE AS DYESTUFFS

[76] Inventors: Marcos Segal; Michael Kunze, both of Hoechst Aktiengesellschaft, P.O. Box 80 03 20, D-6230 Frankfurt am Main 80, Fed. Rep. of Germany

[21] Appl. No.: 849,066

[22] Filed: Apr. 7, 1986

[30] Foreign Application Priority Data

May 17, 1985 [DE] Fed. Rep. of Germany ....... 3517755

[51] Int. Cl.$^4$ .................. C09B 62/085; C09B 62/09; C09B 62/51; C09B 62/513
[52] U.S. Cl. .................................. 534/637; 534/582; 534/598; 534/638; 534/642; 534/887
[58] Field of Search ................ 534/638, 625, 637, 642

[56] References Cited

FOREIGN PATENT DOCUMENTS

| 0094020 | 11/1983 | European Pat. Off. ............ 534/638 |
| 3132917 | 3/1983 | Fed. Rep. of Germany ...... 534/637 |
| 1013442 | 12/1965 | United Kingdom ................ 534/638 |
| 2055880 | 3/1981 | United Kingdom ................ 534/638 |

Primary Examiner—Floyd D. Higel

[57] ABSTRACT

Water-soluble monoazo and disazo compounds having fiber-reactive dye properties which are suitable for dyeing carboxamido and/or hydroxy-containing materials, in particular cellulose fiber materials, and contain as coupling component that of a naphthol, aminonaphthalene or aminobenzene and as diazo component an optionally chlorine-, alkyl-, alkoxy- and/or sulfo-substituted phenyl radical or an optionally substituted phenylazophenyl or phenylazonaphthyl radical having the fiber-reactive group of the general formula

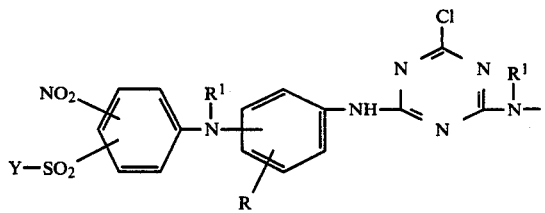

in which the two $R^1$, identical to or different from each other, denote a hydrogen atom or an optionally substituted alkyl group of 1 to 4 carbon atoms, R is a hydrogen atom or a sulfo group and Y represents the vinyl group or a $\beta$-thiosulfatoethyl, $\beta$-phosphatoethyl, $\beta$-chloroethyl or $\beta$-sulfatoethyl group, as substituent, and a further such fiber-reactive grouping can be bonded to the radical of the coupling component.

3 Claims, No Drawings

WATER-SOLUBLE COMPOUNDS CONTAINING ONE OR TWO (NITROPHENYLAMINO)-PHENYLAMINO-CHLOROTRIAZINYLAMINO GROUPS, THE NITROPHENYLAMINO BEING ADDITIONALLY SUBSTITUTED BY A FIBER-REACTIVE GROUP OF THE VINYLSULFONYL SERIES, SUITABLE AS DYESTUFFS

The invention is in the technical field of fiber-reactive dyes.

The present invention provides new valuable water-soluble azo compounds which conform to the general formula (1)

wherein:

Z is a radical of the general formula (2)

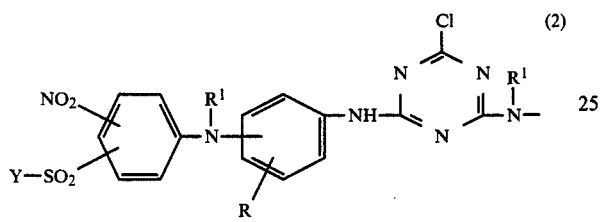

in which $R^1$ stands for a hydrogen atom or an optionally substituted alkyl group of 1 to 4 carbon atoms, it being possible for the two $R^1$ to be identical to or different from each other, R denotes a hydrogen atom or a sulfo group and Y is the vinyl group or a β-thiosulfatoethyl, β-phosphatoethyl, β-chloroethyl or preferably a β-sulfatoethyl group;

k is the number zero or 1;

D is a benzene radical of the general formula (39

in which $R^2$ denotes a hydrogen atom, an alkyl group of 1 to 4 carbon atoms, such as the ethyl group and in particular the methyl group, an alkoxy group of 1 to 4 carbon atoms, such as the ethoxy group and in particular the methoxy group, a chlorine atom or a sulfo group and $R^3$ is a hydrogen atom or a sulfo group, it being possible for $R^2$ and $R^3$ to be identical to or different from each other;

E is the radical of a couplable and diazotizable compound which in the synthesis of compounds (1) serves first as a coupling component and then as a diazo component and represents a phenylene radical, preferably 1,4-phenylene radical, which may be substituted by one or two substituents which are selected from the set consisting of 2 alkyl of 1 to 4 carbon atoms, 2 alkoxy of 1 to 4 carbon atoms, 1 chlorine, 1 bromine, 1 alkanoylamino of 2 to 5 carbon atoms (which may be substituted) of which preferably acetylamino, 1-benzoylamino, 1 sulfo, 1 carboxy, 1 ureido, 1 phenylureido and 1 alkylsulfonylamino of 1 to 4 carbon atoms, or denotes a naphthylene radical, such as an 1,4-naphthylene radical, which may be substituted by 1 or 2 sulfo groups or the —$SO_2$—Y group shown or by 1 sulfo group and the —$SO_2$—Y group shown, Y having the abovementioned meaning, and it being possible for the two Y to be identical to or different from each other, R" is a hydrogen atom or a chlorotriazinylamino radical of the abovementioned and defined general formula (2), both Z being identical to or different from each other;

K is in the case where R" denotes a radical of the general formula (2) a 1-hydroxynaphthylene radical which contains the azo group bonded in the 2-position, or is a 2-hydroxynaphthylene radical which contains the azo group bonded in the 1-position, and which are both preferably substituted by 1 or 2 sulfo groups, or is a 1,4-naphthylene radical which may be substituted by 1 or 2 sulfo groups, or is a phenylene radical such as the 1,4-phenylene radical, which may be substituted by 1 or 2 substituents which are selected from the group consisting of 2 alkyl of 1 to 4 carbon atoms, 2 alkoxy of 1 to 4 carbon atoms, 2 chlorine, 1 bromine, 1 alkanoylamino of 2 to 5 carbon atoms (which may be substituted) of which preferably acetylamino, 1 benzoylamino, 1 sulfo, 1 carboxy, 1 ureido, 1 phenylureido and 1 alkylsulfonylamino of 1 to 4 carbon atoms, or K-R" where R" is a hydrogen atom, is the 1-hydroxynaphthyl radical which contains the azo group bonded in the 2-position, or is the 2-hydroxynaphthyl radical which contains the azo group bonded in the 1-position, which may both be, preferably are, substituted by 1 or 2 sulfo groups, or which may both be substituted by an optionally substituted alkanoylamino group of 2 to 5 carbon atoms or an optionally substituted benzoylamino group or preferably by one or two sulfo groups and an optionally substituted alkanoylamino group of 2 to 5 carbon atoms or an optionally substituted benzoylamino group, or K-R" where R" is a hydrogen atom, is a phenyl radical which is substituted, preferably in the p-position, by a monosubstituted or disubstituted amino group whose substituents are selected from the group of substituents consisting of alkyl of 1 to 4 carbon atoms, hydroxyalkyl of 1 to 4 carbon atoms, carboxyalkyl of 2 to 5 carbon atoms, sulfoalkyl of 1 to 4 carbon atoms, sulfatoalkyl of 1 to 4 carbon atoms, cyanoalkyl of 2 to 5 carbon atoms, carbalkoxyalkyl having alkyl radicals of 1 to 4 carbon atoms each, phenylalkyl having an alkyl radical of 1 to 4 carbon atoms (it being possible for its phenyl radical to be substituted by methyl, ethyl, methoxy, ethoxy, chlorine, carboxy and/or sulfo), phenyl and phenyl substituted by alkyl of 1 to 4 carbon atoms, alkoxy of 1 to 4 carbon atoms, chlorine, carboxy and/or sulfo (such as by alkylamino of 1 to 4 carbon atoms such as methylamino and ethylamino, and N,N-dialkylamino having alkyl groups of 1 to 4 carbon atoms each, such as dimethylamino and diethylamino), and which phenyl radical may additionally be substituted by 1 or 2 substituents which are selected from the group consisting of 2 alkyl of 1 to 4 carbon atoms, 2 alkoxy of 1 to 4 carbon atoms, 2 chlorine, 1 bromine, 1 alkanoylamino of 2 to 5 carbon atoms (which may be substituted) of which preferably acetylamino, 1 benzoylamino, 1 sulfo, 1 carboxy, 1 ureido, 1 phenylureido and 1 alkylsulfonylamino of 1 to 4 carbon atoms.

A sulfo group is a group conforming to the general formula —SO$_3$M, a carboxy group a group conforming to the general formula —COOM, a thiosulfate group a group conforming to the general formula —S—SO$_3$M, a phosphato group a group conforming to the general formula —OPO$_3$M$_2$ and a sulfato group a group conforming to the general formula —OSO$_3$M, where M denotes a hydrogen atom or an alkali metal, such as sodium, potassium or lithium, or the equivalent of an alkaline earth metal, such as of calcium; preferably M is a hydrogen atom and in particular an alkali metal.

The azo compounds according to the invention can be present in the form of their free acids and preferably in the form of their salts, in particular neutral salts; salts to be mentioned in particular are the alkali metal salts. The new compounds are preferably in the form of these salts when finding utility for dyeing and printing hydroxy- and/or carboxamide-containing fiber material. Preferably the formula radical E contains no group of the general formula —SO$_2$Y.

Substituents of substituted alkanoylamino groups of 2 to 5 carbon atoms are for example chlorine, bromine, sulfo, sulfato, carboxy, hydroxy, carbomethoxy and carbethoxy. The nitrogen atom of the alkanoylamino group may also be substituted by an alkali group of 1 to 4 carbon atoms, preferably methyl group. Preferably the alkanoylamino group is an acetylamino or propionylamino group which is not substituted.

Substituents in the benzene nucleus of substituted benzoylamino groups are for example sulfo, carboxy and methyl groups.

Alkyl groups of 1 to 4 carbon atoms which are substituted are for example those which are substituted by one or two, preferably one, substituent from the group consisting of acetylamino, hydroxy, sulfato, alkoxy of 1 to 4 carbon atoms, sulfo and carboxy.

Preferably the formula radicals R$^1$ are a hydrogen atom or an alkyl group of 1 to 4 carbon atoms, such as in particular the methyl or ethyl group.

Preferably Z is a radical Z$^1$ of the general formula (2a)

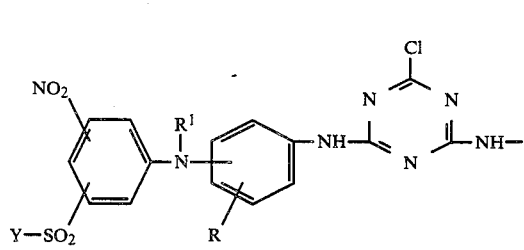

(2a)

in which R, R$^1$ and Y have the abovementioned meanings and the —SO$_2$—Y group and the nitro group are bonded to the benzene nucleus in meta-position relative to each other, but are not both simultaneously in the ortho-position relative to the amino group, and in particular a radical Z$^2$ of the general formula (2b)

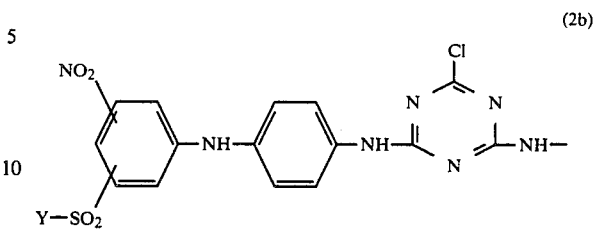

(2b)

in which Y has the abovementioned meaning and the —SO$_2$—Y group and the nitro group are bonded to the benzene nucleus in meta-position relative to each other, but are not both simultaneously in the ortho-position relative to the amino groups.

Particularly preferably the formula radical Z—D— is a radical of the formula (4a), (4b), (4c), (4d) or (4e)

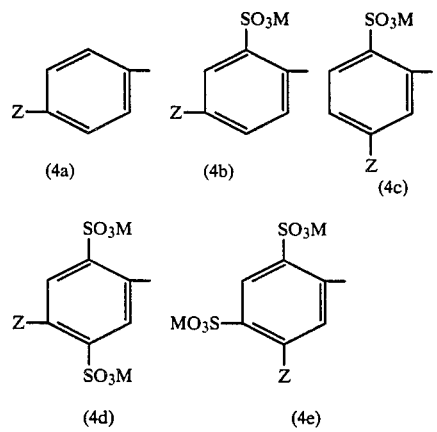

in which M and Z have the abovementioned meanings, but Z is preferably the above-defined radical of the general formula (2a) or in particular of the general formula (2b).

If k stands for the number 1, the formula member E is preferably the 1,4-phenylene radical which may be substituted by an alkanoylamino group of 2 to 5 carbon atoms, such as acetylamino group, a methyl, ethyl, carboxy, sulfo or ureido group or a chlorine atom or by one of these substituents and by a methyl, ethyl, methoxy, ethoxy or sulfo group or a chlorine atom, or is a 1,4-naphthylene radical which may be substituted by one or two sulfo groups.

The present invention also relates to processes for preparing the azo compounds of the general formula (1). These can be prepared according to the invention by reacting a compound of the general formula (5a) or (5b)

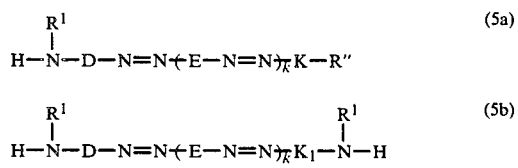

(in which D, E, k and R$^1$ and also R" have the abovementioned meanings and K$_1$ denotes the radical mentioned for K, if R" stands for Z and which can be prepared in a perfectly conventional and known manner by coupling the corresponding diazo and coupling components) with a dichlorotriazine compound of the general formula (6)

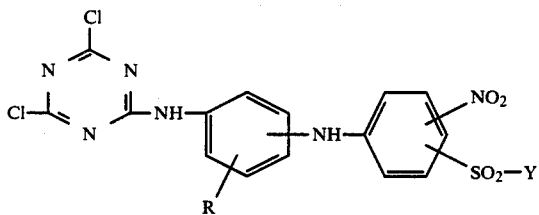
(6)

(in which $R^1$, R and Y have the abovementioned meanings) in a single or twice the molar amount with elimination of one or two moles of hydrogen chloride, or by reacting a compound of the general formula (7)

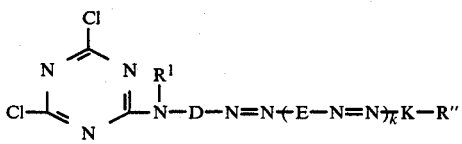
(7)

(where D, E, K, k, R" and $R^1$ have the abovementioned meaning and which can be prepared in a perfectly conventional manner by reacting the compound (5a) with 2,4,6-trichloro-s-triazine (cyanuric chloride)) with an aminodiphenylamine compound of the general formula (8)

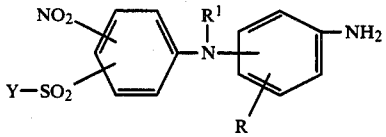
(8)

(in which $R^1$, R and Y have the abovementioned meanings) with elimination of one mole of hydrogen chloride, or by coupling a diazonium compound of an amine of the general formula (9)

(9)

(in which, Z, D, E and k have the meanings indicated for the formula (1)) with a couplable compound of the general formula H—K—R" (where K and R" have the abovementioned meaning, and with the prerequisite, as is known to those skilled in the art, that if R" is equal to the fiber-reactive group Z, the group Z as an acylamino radical is not bonded to the coupling component H—K—Z in a position which impedes the coupling, such as, for ex., is not a naphthalenesulfonic acid substituted in the 1-position by Z).

The diazotization of the aromatic amino compound containing a fiber-reactive group of the formula (2), or of the aminoazo compound of the general formula (9) is effected in a perfectly conventional manner, such as in an aqueous, acid, such as in particular hydrochloric acid, medium by means of an alkali metal nitrite and at a temperature between −5° C. and +15° C. The coupling reaction with the compound of the general formula H—K—R" where K and R" have the abovementioned meaning is subsequently likewise preferably effected in an aqueous medium in a perfectly conventional manner of coupling reactions, for instance at a temperature between 0° and 30° C., preferably between 5° and 20° C., and at a pH value between 4 and 7, preferably between 5 and 6.5.

Coupling components of the general formula H—K—Z are for example compounds of the general formula (10)

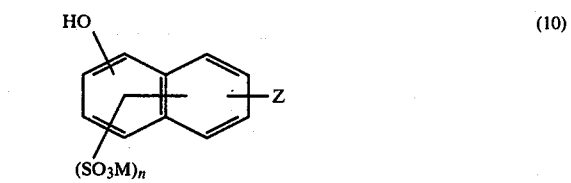
(10)

in which M and Z have the abovementioned meanings and n denotes the number 1 or 2.

However, preference is given to coupling components of the general formula H—K—R" in which R" denotes a hydrogen atom. Of these, preference is given in particular to alkanoylamino- or benzoylamino-substituted 1-naphtholsulfonic acid compounds of the general formula (11a)

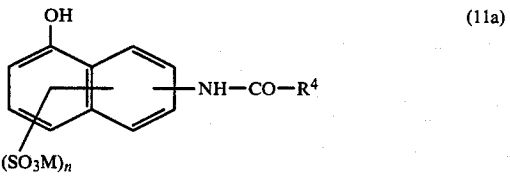
(11a)

in which
$R^4$ stands for an alkyl group of 1 to 4 carbon atoms, preferably the methyl or ethyl group, or for the phenyl group,
n is the number 1 or 2 and
M has the abovementioned meaning,
thus for example 3,4-disulfo-8-acetylamino-1-naphthol, 3,6-disulfo-8-propionylamino-1-naphthol, 3,6-disulfo-8-benzoylamino-1-naphthol, 4,6-disulfo-8-acetylamino-1-naphthol, 4,6-disulfo-8-propionylamino-1-naphthol, 4,6-disulfo-8-benzoylamino-1-naphthol, 3-sulfo-7-acetylamino-1-naphthol, 3-sulfo-7-propionylamino-1-naphthol, 3-sulfo-6-acetylamino-1-naphthol, 3-sulfo-6-propionylamino-1-naphthol, 3-sulfo-5-acetylamino-1-naphthol, 3-sulfo-5-propionylamino-1-naphthol, 3,5-disulfo-6-acetylamino-1-naphthol, 3,5-disulfo-6-propionylamino-1-naphthol, 5-sulfo-8-acetylamino-1-naphthol, 5-sulfo-8-propionylamino-1-naphthol and 5-sulfo-8-benzoylamino-1-naphthol, and also compounds which conform to the general formulae (11b), (11c) and (11d)

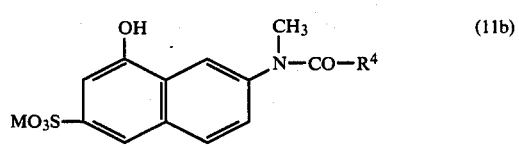
(11b)

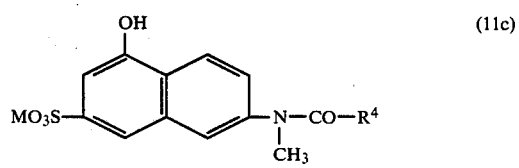
(11c)

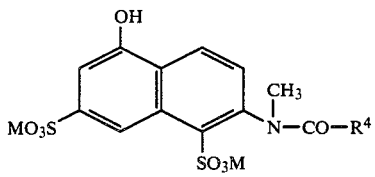

in which M and $R^4$ have the abovementioned meanings, furthermore compounds which conform to the general formula (11e)

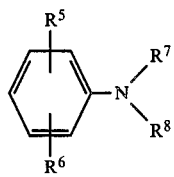

in which
- $R^5$ is a hydrogen atom, a sulfo group, an alkyl group of 1 to 4 carbon atoms, such as the ethyl group and in particular the methyl group, an alkoxy group of 1 to 4 carbon atoms such as the ethoxy group and in particular methoxy group, a chlorine atom or a bromine atom,
- $R^6$ denotes a hydrogen atom, a sulfo group, an alkyl group of 1 to 4 carbon atoms, such as the ethyl group and in particular methyl group, an alkoxy group of 1 to 4 carbon atoms, such as the ethoxy group, and in particular methoxy group, a chlorine atom, a bromine atom, an alkanoylamino group, such as the acetylamino group, the ureido group or an alkylsulfonylamino group of 1 to 4 carbon atoms,
- $R^7$ is a hydrogen atom or an alkyl group of 1 to 4 carbon atoms which may be substituted by a hydroxy, cyano, carboxy, sulfo, sulfato, carbomethoxy or carbethoxy group or a phenyl radical, or is a phenyl radical which may be substituted by alkyl of 1 to 4 carbon atoms, alkoxy of 1 to 4 carbon atoms, chlorine and/or sulfo, and
- $R^8$ is an alkyl group of 1 to 4 carbon atoms which may be substituted by a hydroxy, cyano, carboxy, sulfo, sulfato, carbomethoxy or carbethoxy group, or by a phenyl radical, or is a phenyl radical which may be substituted by alkyl of 1 to 4 carbon atoms, alkoxy of 1 to 4 carbon atoms, chlorine and/or sulfo, it being possible for $R^5$, $R^6$, $R^7$ and $R^8$ to be identical to or different from one another, thus for example N-($\beta$-cyanoethyl)-aniline, N-ethyl-N-($\beta$-sulfoethyl)-aniline, N-ethylaniline, N,N-di-($\beta$-sulfoethyl)-aniline, N-ethyl-N-($\beta$-hydroxyethyl)-aniline, N-($\beta$-sulfoethyl)-aniline, 3-chloro-N,N-di-($\beta$-sulftoethyl)-aniline and N,N-bis-($\beta$-hydroxyethyl)-aniline.

The variant of the process of the invention for reacting a compound of the general formula (5a) or (5b) with a compound of the general formula (6) can be carried out in an aqueous organic medium; it is preferably carried out in aqueous solution. The reaction temperature is in general between 0° and 50° C., preferably between 25° and 45° C., in particular between 35° and 40° C. In general, a pH value between 4 and 8, preferably between 5 and 7, is maintained.

The condensation reaction of an aminoazo compound of the general formula (5a) with cyanuric chloride to give the starting compound (7) is in general effected in an aqueous, neutral to acid solution at a temperature between −10° C. and +20° C., preferably at a temperature between 5° and 10° C. and at a pH value of 4 to 6. The condensation reaction, according to the invention, of the dichlorotriazine-azo compound of the general formula (7) with the aminodiphenylamine compound of the general formula (8) is generally effected subsequently, preferably without further isolation of the previously prepared compound (7) from the reaction batch, in an aqueous organic solution, preferably aqueous, neutral to acid solution, in general at a temperature between 0° and 50° C., preferably between 10° and 40° C., and preferably at a pH value between 3 and 7, in particular between 6 and 6.5.

Coupling components of the general formula H—K—$NHR^1$ where K and $R^1$ have the abovementioned meaning, which can serve for preparing the starting compounds of the general formula (5) or (7), are for example compounds of the general formula (12a), (12b) and (12c)

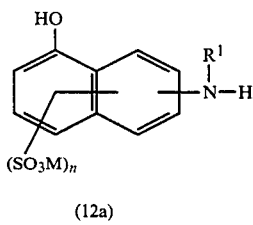 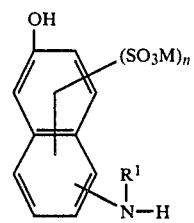

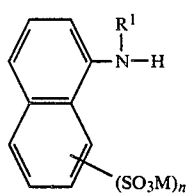

in which M, $R^1$ and n have the abovementioned meanings.

The diazo components which conform to the general formula Z—D—$NH_2$ and Z—D—N=N—E—$NH_2$ and which are used for the preparation of the compounds of the general formula (1) are for example compounds of the general formula (13a) to (13c)

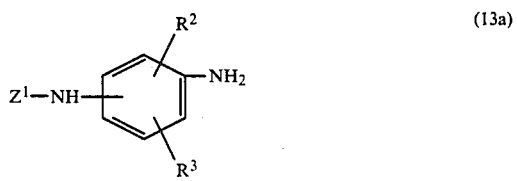

-continued

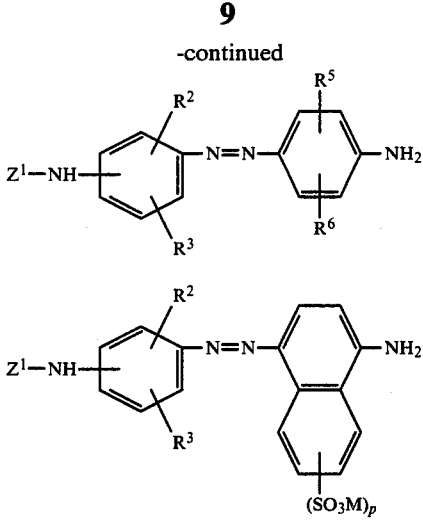

in which M, $R^2$, $R^3$, $R^5$, $R^6$, and $Z^1$ have the abovementioned meanings and p is the number zero, 1 or 2.

Combinations of the abovementioned diazo components which conform to the general formulae (13) and of the previously mentioned coupling components of the general formula (11) give rise to preferred monoazo and disazo compounds of the general formula (1).

The starting compounds of the general formulae (9) or (10) can be prepared in a perfectly conventional manner from the aminonaphthalene and aniline compounds in which the amino groups is present in place of the formula radical Z in the formulae (9) or (10), together with the cyanuric chloride and the aminodiphenylamine compound of the general formula (8). For instance, the synthesis of the compounds of the general formula Z—D—$NH_2$ is effected by reaction of a compound of the general formula $HR^1N$—D—$NH_2$ with a dichlorotriazinylaminodiphenylamine compound of the general formula (6) in an aqueous organic or preferably aqueous medium at a temperature between 10° and 20° C. and at a pH value between 6 and 6.5. The coupling component H—K—Z can be synthesized in a similar manner.

If the abovementioned condensation reactions between the amino compounds and cyanuric chloride or a dichlorotriazinylamino compound and an amino compound are effected in an aqueous organic medium, the organic solvent in question is preferably acetone, dioxane and dimethylformamide.

One of the aminodiphenylamine compounds of the general formula (8) serving as starting compounds is known in the form of its β-hydroxyethylsulfonyl precursor (see German Auslegeschrift No. 1,179,317, Example 5). Other aminodiphenylamine compounds of the formula (8) can easily be prepared analogously with this β-hydroxyethylsulfonyl precursor by means of the corresponding isomeric acylaminoaniline and (β-hydroxyethylsulfonyl)-nitrochlorobenzene compounds.

Thus, for example, 4-amino-2'-(β-hydroxyethylsulfonyl)-5'-nitrodiphenylamine is obtained by reactions of 1,4-phenylenediamine and 2-chloro-5-nitrophenyl-(β-hydroxyethyl)-sulfone in methanolic solution at a temperature between 50° and 70° C. in the course of a few hours, and after cooling down to room temperature and addition of ice-water separates out from the reaction solution in crystals in high yield.

From these β-hydroxyethylsulfonyl-substituted aminodiphenylamine starting compounds the fiber-reactive starting compounds of the general formula (8) can be synthesized in the manner customary for the synthesis of fiber-reactive groups of the vinylsulfonyl series. Preferably they are first converted into their sulfato derivatives by reaction with a sulfating agent analogously to known methods. Sulfating agents are for example sulfuric acid or chlorosulfonic acid in an organic solvent, such as pyridine or N-methylpyrrolidone. Analogous sulfating reactions of this kind are known for example from the previously cited German Auslegeschrift No. 1,179,317 and from British Patent Specification No. 1,540,566 and European Patent Application Publication No. 0,036,383. Preferably, the sulfation of the β-hydroxyethylsulfonyl starting compound to the corresponding compound of the general formula (8) in which Y stands for the β-sulfatoethyl group is effected in 100% strength sulfuric acid at temperatures between 10° and 30° C. From this the sulfuric acid-soluble sulfato compound can be isolated after addition of the sulfuric acid solution to ice-water.

The same method can be used to prepare the compounds of the general formula (8) in which Y stands for the β-phosphatoethyl group by reaction with a suitable and, for this purpose, customary phosphating agent, such as phosphoric acid polyphosphoric acid.

The β-sulfatoethylsulfonyl compounds of the general formula (8) can be used to prepare the corresponding vinylsulfonyl compounds (where Y is equal to the vinyl group in formula (8)) by reaction with an alkali in aqueous solution, for example by treating a solution of the sulfato compound in alkaline aqueous solution at a pH value between 8 and 10 and at a temperature between about 40° and 60° C. for a short time.

These vinylsulfonyl compounds of the general formula (8) can be used to prepare the corresponding β-thiosulfatoethylsulfonyl compounds by reaction with an alkali metal thiosulfate, for example by reacting the vinylsulfonyl compound of the formula (8) with sodium thiosulfate, advantageously in excess, such as an excess of 21–40%, in aqueous weakly acid solution at a temperature between 30° and 80° C.

Aminodiphenylamine starting compounds of the general formula (8) are for example 1-nitro-2-(4'-aminophenylamino)-5-(β-sulfatoethylsulfonyl)-benzene, 1-nitro-4-(4'-aminophenylamino)-5-(β-sulfatoethylsulfonyl)-benzene, 1-nitro-2-(3'-aminophenylamino)-5-(β-sulfatoethylsulfonyl)-benzene, 1-nitro-2-(4'-amino-3'-sulfophenylamino)-5-(β-sulfatoethylsulfonyl)-benzene and 1-nitro-2-(4'-amino-2'-sulfophenylamino)-5-(β-sulfatoethylsulfonyl)-benzene.

Aromatic amines of the general formula $H_2N$—D—$NH_2$, which can serve as diazo components for synthesizing the compounds according to the invention, are for example, 1,4-diaminobenzene, 1,3-diaminobenzene, 1,4-diaminobenzene-2-sulfonic acid, 1,3-diaminobenzene-4-sulfonic acid, 1,4-diaminobenzene-2,5-disulfonic acid, 1,3-diaminobenzene-4,6-disulfonic acid, 1,4-diaminobenzene-2,6-disulfonic acid, 1,4-diamino-3-methylbenzene, 1,3-diamino-4-methoxybenzene.

Compounds conforming to the general formula H—E—$NH_2$ or H—$E_1$(—$SO_2$—Y)—$NH_2$, which can serve for preparing the disazo compounds according to the invention, are for example aniline, 3-methylaniline, 3-chloroaniline, 2,5-dimethylaniline, 2,5-dimethoxyaniline, 3-methoxyaniline, 3-methyl-6-methoxyaniline, 3-aminophenylurea, 3-acetylamino-6-methylaniline, 2-amino-4-acetylaminobenzene-1-sulfonic acid, 1,3-diaminobenzene, 1,3-diamino-4-methyl- or -methoxybenzene, 1,3-diaminobenzene-4-sulfonic acid, 1-aminonaphthalene, 1-aminonaphthalene-6- or -7-sulfonic acid, 3-acetylaminoaniline, 2-methylaniline, 2-methoxyaniline, 3-benzoylaminoaniline, 2,3-dimethylaniline, 3,5-dimethylaniline, 1-amino-2-methoxy-5-acetylaminobenzene, similarly also 1-amino-7-sulfo-5-($\beta$-sulfatoethylsulfonyl)-naphthalene, 1-amino-5-($\beta$-sulfatoethylsulfonyl)-naphthalene, 1-amino-6-($\beta$-sulfatoethylsulfonyl)-naphthalene, 1-amino-7-($\beta$-sulfatoethylsulfonyl)-naphthalene, and their corresponding $\beta$-thiosulfatoethylsulfonyl, $\beta$-phosphatoethylsulfonyl, $\beta$-chloroethylsulfonyl and vinylsulfonyl derivatives.

Further starting compounds which conform to the general formula H—K—NHR$^1$ are for example aniline, 3-methylaniline, 3-chloroaniline, 2,5-dimethylaniline, 2,5-dimethoxyaniline, 3-methoxyaniline, 3-methyl-6-methoxyaniline, 3-aminophenylurea, 3-acetylamino-6-methylaniline, 2-amino-4-acetylaminobenzene-1-sulfonic acid, 1-aminonaphthalene, 1-aminonaphthalene-6- or -7-sulfonic acid, 3-acetylaminoaniline, 2-amino-8-naphthol-6-sulfonic acid, 2-amino-8-naphthol-4,6-disulfonic acid, 2-amino-5-naphthol-7-sulfonic acid, 3-amino-5-naphthol-7-sulfonic acid, 1-amino-5-naphthol-7-sulfonic acid, 1-aminonaphthalene-8-sulfonic acid, 1-amino-8-naphthol-3,6-disulfonic acid, 1-amino-8-naphthol-4,6-disulfonic acid, 2-methylaniline, 2-methoxyaniline, 3-benzoylaminoaniline, 2,3-dimethylaniline, 3,5-dimethylaniline, 1-amino-2-methoxy-5-acetylaminobenzene, N-methylaniline, 3-chloro-N-methylaniline, N-($\beta$-cyanoethyl)-aniline and N-ethylaniline.

Coupling components which according to the invention can serve for preparing the azo compounds of the general formula (1) and which conform to the general formula H—K—Z are for example the following aminonaphtholsulfonic acids to whose amino or methylamino group is bonded the fiber-reactive radical Z$^3$ of the general formula (2c)

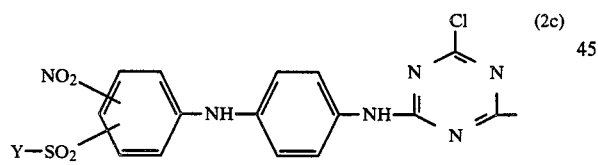

in which Y has the abovementioned meaning and the —SO$_2$—Y group and the nitro group are bonded to the benzene nucleus in meta-position relative to each other, but are not both simultaneously in the ortho-position relative to the amino group: 1-amino-3,6-disulfo-8-naphthol, 1-amino-4,6-disulfo-8-naphthol, 2-amino-3,6-disulfo-8-naphthol, 3-amino-6-sulfo-8-naphthol, 3-amino-4,6-disulfo-8-naphthol, 3-methylamino-6-sulfo-8-naphthol, 1-amino-7-sulfo-5-naphthol, 2-amino-6-sulfo-8-naphthol, 1-amino-4-sulfo-8-naphthol, 2-methylamino-6-sulfo-8-naphthol, 2-amino-5-naphthol-7-sulfonic acid, 1-amino-2,4-disulfo-8-naphthol.

Of the azo compounds according to the invention of the general formula (1), emphasis can be given in particular to those groups of compounds which conform to the general formulae (14), (15), (16), (17) and (18):

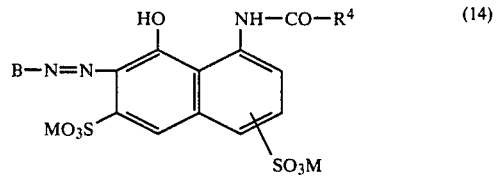

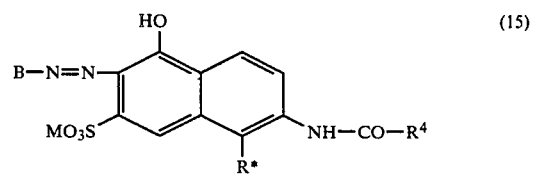

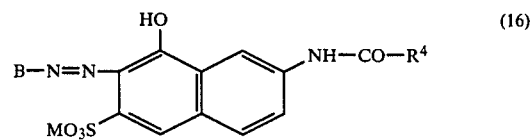

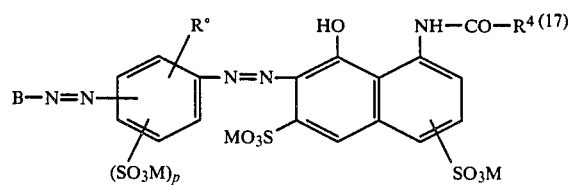

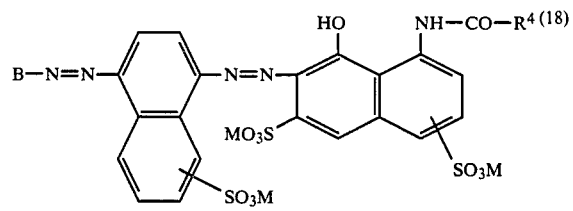

in which

M has the abovementioned meaning

B is a radical of the general formula (4a), (4b), (4c), (4d) or (4e) in which Z$^1$ preferably has the meaning of Z$^2$, p is the number zero, 1 or 2, R* is a hydrogen atom or a sulfo group;

R° is a hydrogen atom, a chlorine or bromine atom, an alkanoylamino group of 2 to 5 carbon atoms, such as an acetylamino group, a sulfo, carboxy, methyl, ethyl, methoxy or ureido group and R$^4$ denotes here the methyl, ethyl or phenyl group. Particularly preferably in these compounds the formula radical Y is a $\beta$-sulfatoethyl group.

Of the compounds of the general formula (14) to (18), preference is given in particular to those in which the sulfo group in the formula radical B is bonded to the benzene or naphthalene nucleus in the ortho-position relative to the azo group.

The precipitation and isolation of the compounds of the general formula (1) prepared according to the invention from the synthesis solutions can be effected by commonly known methods, thus for example either by precipitating from the reaction medium by means of electrolysis, such as, for example, sodium chloride or potassium chloride, or by evaporating the reaction solution, for example by spray-drying, it being possible to add a buffer substance to this reaction solution.

The compounds according to the invention of the general formula (1) have fiber-reactive properties and possess very good dyestuff properties. They can therefore be used for dyeing (including printing) hydroxy-containing and/or carboxamido-containing materials. It is also possible to use the solutions obtained in the synthesis of the compounds according to the invention, directly in dyeing as a liquid composition, where appropriate after addition of a buffer substance and where appropriate also after concentration.

The present invention therefore also relates to the use of the compounds according to the invention of the general formula (1) for dyeing (including printing) hydroxy- and/or carboxamido-containing materials, respectively to processes for their application to these substrates. This includes mass coloration, such as, for example, of polyamide films. The materials are preferably treated in the form of fiber materials, in particular in the form of textile fibers, such as yarns, wound packages and fabrics. Herein it is possible to proceed analogously to known ways of processing.

Hydroxy-containing materials are those of natural or synthetic origin, such as, for example, cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose rayon and filament viscose rayon.

Carboxamido-containing materials are for example synthetic and natural polyamides and polyurethanes, in particular in the form of fibers, for example wool and other animal hairs, silk, leather, nylon-6.6, nylon-6, nylon-11 and nylon-4.

The compounds according to the invention of the formula (1) can be applied and fixed in accordance with the use according to the invention on the substrates mentioned, in particular on the fiber materials mentioned, using the application techniques known for water-soluble dyes, in particular fiber-reactive dyes, for example by putting the azo compound of the general formula (1) in dissolved form onto or into the substrate and fixing it thereon or therein, where appropriate through the agency of heat and/or where appropriate through the agency of an alkaline agent. Such ways of dyeing and fixing are numerously described in the literature.

Thus they produce on cellulose fibers by the exhaust methods from long liquor using a very wide variety of acid-binding agents and where appropriate neutral salts, such as sodium chloride or sodium sulfate, very good color yields and an excellent color buildup. Dyeing is preferably carried out in an aqueous bath at temperatures between 40° and 105° C., where appropriate at temperatures up to 130° C. under pressure, and where appropriate in the presence of customary dyeing auxiliaries. A possible procedure is to introduce the material into the warm bath and gradually to heat the latter to the desired dyeing temperature and to complete the dyeing process of that temperature. The neutral salts which speed up the exhaustion of the dye can if desired also be added to the bath not until the actual dyeing temperature is reached.

The padding processes likewise produce on cellulose fibers good color yields and a good color buildup, customary fixing options being dwelling at room temperature or elevated temperature, for example up to about 60° C., steaming or dry heat.

The customary printing methods for cellulose fibers, which can be carried out in one step, for example by printing with a print paste containing the compound according to the invention and sodium bicarbonate or some other acid-binding agent and subsequent steaming at 100° to 103° C., or in two steps, for example by printing with a neutral or weakly acid print paste which contains the compound according to the invention and subsequent fixing of the compound according to the invention either by passing the printed material through a hot alkali- and electrolyte-containing bath or by overpadding with an alkaline electrolyte-containing padding liquor and subsequent dwelling of this overpadded material or steaming or treatment with dry heat, likewise produce strong prints having well defined outlines and a clear white ground. The outcome of the prints depends only little on varying fixing conditions. Both in dyeing and printing the degrees of fixation obtained with the compounds according to the invention are very high.

Fixing by means of dry heat in the customary thermofixing processes employs hot air at 120° to 200° C. When fixing by means of steam it is possible to use in addition to customary steam at 101° to 103° C. also superheated steam and high-pressure steam at temperatures up to 160° C.

The acid-binding agents which effect fixation of the compound of the formula (1) to the cellulose fibers are for example water-soluble basic salts of alkali metals and alkaline earth metals of organic or inorganic acids or compounds which liberate alkali when hot. There may be mentioned in particular the alkali metal hydroxides and alkali metal salts of weak to medium-strength organic or inorganic acids, preferably their sodium and potassium compounds. Such acid-binding agents are for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, sodium silicate and trisodium phosphate.

By treating the compounds according to the invention (dyes) with the acid-binding agents, where appropriate under the agency of heat, the dyes are bonded chemically to the cellulose fiber; in particular the cellulose dyeings display, after the customary aftertreatment by rinsing to remove unfixed dye portions, excellent wet fastness properties, in particular since unfixed dye portions are readily washed off on account of their high solubility in cold water.

The dyeings and prints prepared with the compounds according to the invention (dyes) on cellulose materials possess a high tinctorial strength, good light fastness properties and good to very good wet fastness properties, such as, for example, good to very good wash fastness properties at 60° to 95° C., even in the presence of perborates, acid and alkaline fulling, cross-dyeing and perspiration fastness properties, good to very good acid and alkaline perspiration fastness properties, a high steam resistance, good to very good alkali, acid, water and seawater fastness properties, and also a good pleating fastness, hot press fastness and rub fastness. They also have a very good resistance to acid fading on storing moist dyed material still containing acetic acid (compare German Auslegeschrift No. 2,322,236).

Particularly noteworthy are the good wet light fastness properties of cellulose fiber material dyeings and prints moistened with distilled water or tap water and their alkaline perspiration light fastness. In this respect the dyes according to the invention are surprisingly superior to the known and structurally most comparable fiber-reactive dyes mentioned at the beginning, which contain as a reactive group likewise a monochlorotriazinyl radical and a fiber-reactive group of the vinylsulfonyl series.

The dyeings on polyurethane fibers or natural or synthetic polyamide fibers are customarily carried out from an acid medium. It is thus possible for example to add to the dyebath acetic acid and/or ammonium sulfate, sodium acetate and/or ammonium acetate, in order to obtain the desired pH value. To obtain an acceptable levelness of the dyeing, it is advisable to add customary leveling auxiliaries, based, for example, on a reaction product of cyanuric chloride with three times the molar amount of an aminobenzenesulfonic acid and/or of an aminonaphthalenesulfonic acid or based on a reaction product of for example stearylamine with ethylene oxide. As a rule, the material to be dyed is entered into the bath at a temperature of about 40° C., is agitated therein for some time, the dyebath is then adjusted to the desired weakly acid, preferably weakly acetic acid, pH value, and the actual dyeing is carried out at a temperature between 60° and 98° C. But the dyeings can also be carried out at the boil or at temperatures up to 120° C. (under pressure).

The process of dyeing wool is herein effected in conventional and known manner by subjecting the fiber-reactive compound of the general formula (1) to the exhaustion process while controling of the pH value, preferably first from an acid dyebath having a pH of about 3.5 to 5.5, and toward the end of the dyeing time shifting the pH value into the neutral and where appropriate weakly alkaline range up to a pH value of 8.5, in order to bring about the full reactive bond between this dye of the formula (1) and the fiber, in particular when high depths of shade are desired. At the same time the portion of the dye which is not reactively bonded is dissolved off.

The method of processing described here is also applicable to preparing dyeings on fiber materials made of other natural polyamides or of synthetic polyamides and polyurethanes. The dyeings are carried out at temperatures of 60° to 100° C., but they can also be effected in sealed dyeing apparatuses at temperatures up to 106° C. Since the compounds of the general formula (1) are very readily water-soluble, they can advantageously also be used in conventional continuous dyeing processes. The tinctorial strength of the compounds according to the invention of the general formula (1) is very high. They produce on the fiber materials, in particular in the reactive dyeing of wool, strong, fast, dyeings. On using dyeing temperatures of 100° to 106° C. the bath exhaustion is found to be high.

With the dyeings obtainable with the compounds according to the invention of the general formula (1) it is possible to dispense with an otherwise customary ammonical aftertreatment of the dyed material. They have a very good color buildup where the brilliant hue is retained in deep shades. They are moreover highly compatible with other fiber-reactive wool dyes which permit a surprisingly level dyeing of the fiber. Similarly, material made of wool fibers of different provenances can be dyed level with the compound according to the invention. To improve the leveling behavior it is possible where appropriate to add a customary leveling auxiliary, such as, for example, N-methyltaurine.

The examples below serve to illustrate the invention. The parts and percentages are by weight, unless otherwise stated. Parts by weight relate to parts by volume as the kilogram relates to the liter.

The compounds described in terms of formulae in these examples are shown in the form of the free acids; they are generally prepared and isolated in the form of their sodium or potassium salts and used for dyeing in the form of their salts. The starting compounds and components mentioned in the Examples below, in particular the Table Examples, in the form of the free acid can likewise be used in the synthesis as such or in the form of their salts, preferably alkali metal salts, such as sodium or potassium salts.

EXAMPLE 1

(a) A solution of 18 parts of 1,3-diaminobenzene-4-sulfonic acid in a mixture of 20 parts of water and 18 parts by volume of aqueous 5N sodium hydroxide solution is gradually added with stirring at a pH value between 4 and 5 to a suspension of 18 parts of cyanuric chloride in 60 parts of ice-water; the reaction temperature is maintained at 5° to 10° C. by external cooling. Stirring is continued under these reaction conditions for two hours. Then, while a pH value of 6 is maintained by means of dilute aqueous sodium carbonate solution, a suspension of 42 parts of 1-nitro-2-(4'-aminophenylamino)-5-($\beta$-sulfatoethylsulfonyl)-benzene in 50 parts of water is added, and the reaction temperature is gradually raised to 25° C. On completion of the condensation reaction the resulting solution is acidified with 18 parts of 31% strength aqueous hydrochloric acid and is cooled down to a temperature of 0° to 5° C. by adding ice; the diazotization reaction is carried out in conventional manner with aqueous 1N sodium nitrite solution.

(b) The diazonium salt suspension obtained under (a) is added to a weakly acid solution of 41 parts of 1-acetylamino-8-naphthol-3,6-disulfonic acid in 50 parts of water. The pH value is brought to 6, and the coupling reaction is completed by maintaining this pH value by means of dilute aqueous sodium carbonate solution and at a temperature between 6° and 10° C.

The azo compound according to the invention is isolated in conventional manner. This gives a dark red electrolyte-containing powder of the sodium salt of the compound of the formula

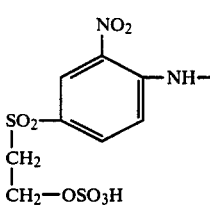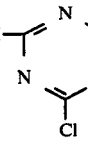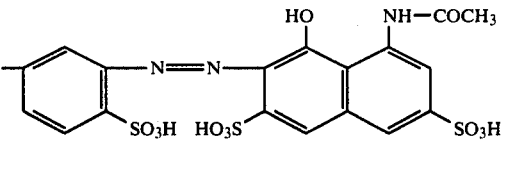

which has very good fiber-reactive dye properties and an absorption peak at 509 nm in aqueous solution and produces by the customary application and fixing methods on the materials mentioned in the description, in particular on cellulose fiber materials, such as cotton, strong yellowish red dyeings and prints having good wash fastness properties.

EXAMPLES 2 TO 21

The tabulated examples below describe further monoazo compounds according to the invention which conform to a general formula (A)

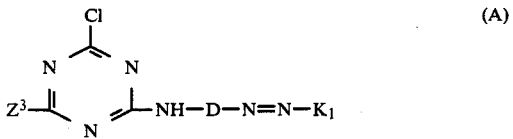

(A)

in which D corresponds to the radical of the aromatic diamino compound $H_2N$—D—$NH_2$, $K_1$ to the radical of a coupling component H—$K_1$ and $Z^3$ to the amino radical of the aminonitrodiphenylamine of the general formula (8) mentioned in the description. They can be prepared in a manner according to the invention, for example analogously to the above example, from the components visible in the formula (such as the aromatic diamino compound, cyanuric chloride and the aminonitrodiphenylamine H—$Z^3$ of the general formula (8) mentioned in the description and from the coupling component which conforms to the general formula H—$K_1$). They have very good fiber-reactive dye properties and produce on the materials mentioned in the description, such as in particular cellulose fiber materials, by the application methods customary in the industry, preferably by the application and fixing methods customary for fiber-reactive dyes, strong dyeings and prints having good fastness properties, such as, for example, fastness properties indicated in example 1, in the hue on cotton indicated in the respective tabulated example.

| | Azo compound conforming to the formula (A) | | | |
|---|---|---|---|---|
| Example | Aminodiphenylamine H—$Z^3$ | Radical —D— corresponding to diamine $H_2N$—D—$NH_2$ | Coupling component H—$K_1$ | Hue |
| 2 | 1-Nitro-2-(4'-aminophenyl-amino)-5-(β-sulfatoethyl-sulfonyl)-benzene | ![benzene-SO3H with methyl] | 2-Acetylamino-5-naphthol-1,7-disulfonic acid | orange |
| 3 | 1-Nitro-4-(4'-aminophenyl-amino)-5-(β-sulfatoethyl-sulfonyl)-benzene | " | 3-Acetylamino-5-naphthol-7-sulfonic acid | orange |
| 4 | 1-Nitro-4-(4'-aminophenyl-amino)-5-(β-sulfatoethyl-sulfonyl)-benzene | " | 1-Benzoylamino-8-naphthol-4,6-disulfonic acid | red |
| 5 | 1-Nitro-2-(3'-aminophenyl-amino)-5-(β-sulfatoethyl-sulfonyl)-benzene | " | 1-Benzoylamino-8-naphthol-4,6-disulfonic acid | red |
| 6 | 1-Nitro-2-(3'-aminophenyl-amino)-5-(β-phosphatoethyl-sulfonyl)-benzene | " | 1-Benzoylamino-8-naphthol-3,6-disulfonic acid | red |
| 7 | 1-Nitro-2-(4'-aminophenyl-amino)-5-(β-sulfatoethyl-sulfonyl)-benzene | ![benzene with SO3H] | 1-Acetylamino-8-naphthol-3,6-disulfonic acid | red |
| 8 | 1-Nitro-2-(4'-aminophenyl-amino)-5-vinylsulfonyl | " | 1-Acetylamino-8-naphthol-3,6-disulfonic acid | red |
| 9 | 1-Nitro-2-(4'-aminophenyl-methylamino)-5-(β-sulfato-ethylsulfonyl)-benzene | " | 1-Acetylamino-8-naphthol-3,6-disulfonic acid | red |

-continued

| Example | Aminodiphenylamine H—Z³ | Radical —D— corresponding to diamine H₂N—D—NH₂ | Coupling component H—K₁ | Hue |
|---|---|---|---|---|
| 10 | 1-Nitro-2-(4'-aminophenyl-amino)-5-(β-sulfatoethyl-sulfonyl)-benzene | phenyl-SO₃H | 2-Acetylamino-5-naphthol-7-sulfonic acid | orange |
| 11 | 1-Nitro-4-(4'-aminophenyl-amino)-5-(β-sulfatoethyl-sulfonyl)-benzene | " | 2-Acetylamino-5-naphthol-7-sulfonic acid | orange |
| 12 | 1-Nitro-4-(4'-aminophenyl-amino)-5-(β-sulfatoethyl-sulfonyl)-benzene | phenyl-SO₃H (other position) | 2-Acetylamino-5-naphthol-7-sulfonic acid | orange |
| 13 | 1-Nitro-2-(4'-aminophenyl-amino)-5-(β-sulfatoethyl-sulfonyl)-benzene | " | 2-Acetylamino-5-naphthol-7-sulfonic acid | orange |
| 14 | 1-Nitro-2-(4'-aminophenyl-amino)-5-(β-sulfatoethyl-sulfonyl)-benzene | phenyl-SO₃H | 2-benzoylamino-5-naphthol-7-sulfonic acid | orange |
| 15 | 1-Nitro-2-(4'-aminophenyl-amino)-5-(β-sulfatoethyl-sulfonyl)-benzene | phenyl with HO₃S and SO₃H | 1-Acetylamino-8-naphthol-3,6-disulfonic acid | red |
| 16 | 1-Nitro-2-(4'-aminophenyl-amino)-5-(β-sulfatoethyl-sulfonyl)-benzene | phenyl with two SO₃H | 3-Acetylamino-5-naphthol-7-sulfonic acid | orange |
| 17 | 1-Nitro-2-(4'-aminophenyl-methylamino)-5-(β-sulfato-ethylsulfonyl)-benzene | phenyl-SO₃H | 1-Naphthol-4,8-disulfonic acid | red |
| 18 | 1-Nitro-4-(4'-aminophenyl-amino)-5-(βsulfatoethyl-sulfonyl)-benzene | " | 1-Naphthol-4,8-disulfonic acid | red |
| 19 | 1-Nitro-2-(4'-aminophenyl-amino)-5-(β-sulfatoethyl-sulfonyl)-benzene | phenyl-SO₃H | 1-Naphthol-4,8-disulfonic acid | red |
| 20 | 1-Nitro-2-(4'-aminophenyl-amino)-5-(βsulfatoethyl-sulfonyl)-benzene | " | 1-Naphthol-4-sulfonic acid | red |
| 21 | 1-Nitro-2-(4'-aminophenyl-amino)-5-(β-sulfatoethyl-sulfonyl)-benzene | phenyl-SO₃H | 1-Naphthol-4-sulfonic acid | red |

EXAMPLE 22

The diazonium suspension obtained in Example (1a) is added to a weakly acid solution of 22 parts of 1-naphthylamine-6-sulfonic acid in 100 parts of water. The pH value is brought to 5, and the coupling reaction is completed by maintaining this pH value by means of aqueous sodium carbonate solution at a temperature of 5° to 10° C. Thereafter the solution is acidified with 30 parts of 31% strength aqueous hydrochloric acid, and the diazotization reaction is carried out in conventional manner with aqueous 1N sodium nitrite solution.

The diazonium salt suspension thus obtained is added to a weakly acid solution of 40 parts of 1-acetylamino-8-naphthol-3,6-disulfonic acid in 100 parts of water. The pH value is brought to 6, and the coupling reaction is completed by maintaining the pH value by means of aqueous sodium carbonate solution at a temperature of 5° to 10° C. The diazo compound according to the invention is isolated in conventional manner. This gives a black electrolyte-containing powder of the sodium salt of the compound of the formula in which D corresponds to the radical of the aromatic diamino compound $H_2N$—D—$NH_2$, E to the bivalent radical of a couplable and diazotizable middle component, $K_1$ to the radical of a coupling component H—$K_1$ and $Z^3$ to the amino radical of the aminonitrodiphenylamine of the general formula (8) mentioned in the description. They can be prepared in a manner according to the invention, for example analogously to the above Example 22, from the components visible in the formula (such as the aromatic diamino compound, cyanuric chloride and the aminonitrodiphenylamine H—$Z^3$ according to the general formula (8) mentioned in the

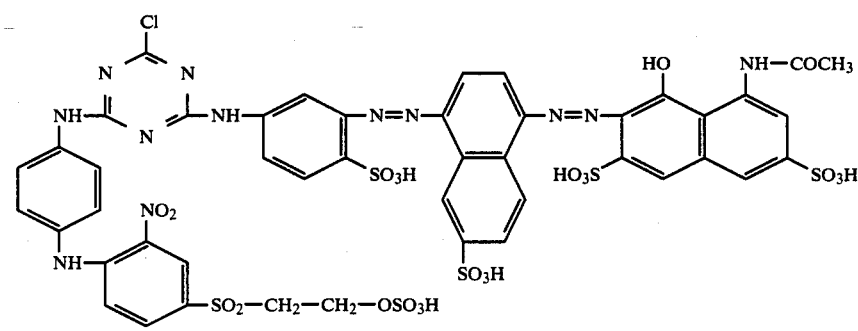

which produces deep reddish navy, fast dyeings on cotton.

EXAMPLES 23 TO 42

The tabulated examples below describe further disazo compounds according to the invention which conform to a general formula (B)

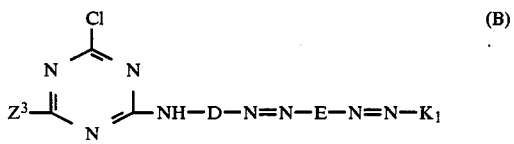

(B)

description, the middle component as well as the coupling component corresponding to the general formula H—$K_1$). They have very good fibre-reactive dye properties and produce on the materials mentioned in the description, such as in particular cellulose fibre materials, by the application methods customary in the industry, preferably by the application and fixing methods customary for fibre-reactive dyes, strong dyeings and prints having good fastness properties, in the hue on cotton indicated in the respective tabulated example.

| | | Disazo compound conforming to the formula (B) | | |
| --- | --- | --- | --- | --- |
| | | Formula radical | | |
| Example | Aminodiphenylamine H—$Z^3$ | —D—N=N—E—N=N— | Coupling component H—$K_1$ | Hue |
| 23 | 1-Nitro-2-(4'-aminophenyl-amino)-5-($\beta$-sulfatoethyl-sulfonyl)-benzene | ![benzene-N=N-naphthalene with SO3H groups] | 1-Benzoylamino-8-naphthol-3,6-disulfonic acid | navy |
| 24 | 1-Nitro-2-(4'-aminophenyl-amino)-5-($\beta$-sulfatoethyl-sulfonyl)-benzene | " | 1-Acetylamino-8-naphthol-4,6-disulfonic acid | navy |
| 25 | 1-Nitro-2-(4'-aminophenyl-amino)-5-($\beta$-sulfatoethyl-sulfonyl)-benzene | " | 2-Acetylamino-5-naphthol 7-sulfonic acid | navy |
| 26 | 1-Nitro-4-(4'-aminophenyl-amino)-5-($\beta$-sulfatoethyl-sulfonyl)-benzene | " | 1-Acetylamino-5-naphthol-7-sulfonic acid | navy |

-continued

| | | Disazo compound conforming to the formula (B) | | |
|---|---|---|---|---|
| Example | Aminodiphenylamine H—Z³ | Formula radical —D—N=N—E—N=N— | Coupling component H—K₁ | Hue |
| 27 | 1-Nitro-2-(4'-aminophenyl)-amino-5-(β-sulfatoethyl-sulfonyl)-benzene | [structure: benzene with SO₃H and N=N linked to naphthalene with SO₃H] | 1-Acetylamino-8-naphthol-3,6-disulfonic acid | navy |
| 28 | 1-Nitro-2-(4'-aminophenyl)-amino-5-vinylsulfonyl | " | 1-Acetylamino-8-naphthol-3,6-disulfonic acid | navy |
| 29 | 1-Nitro-2-(4'-aminophenyl-methylamino)-5-(β-sulfato-ethylsulfonyl)-benzene | [structure: benzene-SO₃H—N=N—benzene with NH-CO-NH₂] | 1-Acetylamino-8-naphthol-3,6-disulfonic acid | navy |
| 30 | 1-Nitro-2-(4'-aminophenyl)-amino-5-(β-sulfatoethyl-sulfonyl)-benzene | " | 1-Acetylamino-8-naphthol-4,6-disulfonic acid | navy |
| 31 | 1-Nitro-2-(4'-aminophenyl)-amino-5-(β-sulfatoethyl-sulfonyl)-benzene | [structure: benzene-SO₃H—N=N—benzene-SO₃H] | 1-Benzoylamino-8-naphthol-3,6-disulfonic acid | navy |
| 32 | 1-Nitro-2-(4'-aminophenyl)-amino-5-(β-sulfatoethyl-sulfonyl)-benzene | [structure: benzene-SO₃H—N=N—benzene with two CH₃] | 1-Acetylamino-8-naphthol-3,6-disulfonic acid | navy |
| 33 | 1-Nitro-2-(4'-aminophenyl)-amino-5-(β-sulfatoethyl-sulfonyl)-benzene | [structure: benzene with two SO₃H—N=N—benzene with two CH₃] | 1-Acetylamino-8-naphthol-3,6-disulfonic acid | navy |
| 34 | 1-Nitro-2-(4'-aminophenyl)-amino-5-(β-sulfatoethyl-sulfonyl)-benzene | " | 2-Acetylamino-5-naphthol-7-sulfonic acid | navy |
| 35 | 1-Nitro-2-(4'-aminophenyl)-amino-5-(β-sulfatoethyl-sulfonyl)-benzene | [structure: benzene-SO₃H—N=N—benzene-CH₃] | 1-Acetylamino-8-naphthol-3,6-disulfonic acid | navy |
| 36 | 1-Nitro-2-(4'-aminophenyl)-amino-5-(β-sulfatoethyl-sulfonyl)-benzene | [structure: benzene-SO₃H—N=N—benzene-NH-CO-CH₃] | 1-Acetylamino-8-naphthol-3,6-disulfonic acid | navy |

-continued

| | | Disazo compound conforming to the formula (B) | | |
|---|---|---|---|---|
| Example | Aminodiphenylamine H—$Z^3$ | Formula radical —D—N=N—E—N=N— | Coupling component H—$K_1$ | Hue |
| 37 | 1-Nitro-2-(4'-aminophenyl-amino)-5-(β-sulfatoethyl-sulfonyl)-benzene | [structure with $SO_3H$, $SO_3H$, NH—CO—$CH_3$] | 1-Acetylamino-8-naphthol-3,6-disulfonic acid | navy |
| 38 | 1-Nitro-2-(4'-aminophenyl-amino)-5-(β-sulfatoethyl-sulfonyl)-benzene | [structure with $SO_3H$, $CH_3$] | 1-Acetylamino-8-naphthol-4,6-disulfonic acid | navy |
| 39 | 1-Nitro-2-(4'-aminophenyl-amino)-5-(β-sulfatoethyl-sulfonyl)-benzene | " | 2-Acetylamino-5-naphthol-7-sulfonic acid | navy |
| 40 | 1-Nitro-2-(4'-aminophenyl-amino)-5-(β-sulfatoethyl-sulfonyl)-benzene | [structure with $SO_3H$, $SO_3H$, NH—CO—$CH_3$] | 1-Acetylamino-8-naphthol-3,6-disulfonic acid | navy |
| 41 | 1-Nitro-2-(4'-aminophenyl-amino)-5-(β-sulfatoethyl-sulfonyl)-benzene | [structure with $SO_3H$, $SO_2$—$CH_2$—$CH_2$—$OSO_3H$] | 1-Acetylamino-8-naphthol-3,6-disulfonic acid | navy |
| 42 | 1-Nitro-2-(4'-aminophenyl-amino)-5-(β-sulfatoethyl-sulfonyl)-benzene | [structure with $SO_3H$, $SO_3H$, $SO_2$—$CH_2$—$CH_2$—$OSO_3H$] | 1-Acetylamino-8-naphthol-3,6-disulfonic acid | navy |

EXAMPLE 43

To 27.7 parts of hydrochloric acid diazotized 3-acetylamino-6-sulfoaniline is added at 5° C. a suspension of 36.1 parts of 1-acetylamino-8-naphthol-3,6-disulfonic acid in 100 parts of water. The coupling is carried out at a pH value of 6. On completion of the coupling the acetylamino group of the resulting azo compound is hydrolyzed at a pH value of 14 (after addition of 60 parts of 33% strength aqueous sodium hydroxide solution) at a temperature of 95° C. in the course of 2 hours. The solution is then cooled down to 5° C. and is brought to pH 4.5 with 29 parts of 98% strength sulfuric acid. 37 parts of solid cyanuric chloride are then slowly added; the condensation reaction is carried out at a pH value of 4.5 by maintaining this pH value with dilute aqueous sodium hydrogen carbonate solution.

On completion of the condensation reaction this batch has added to it a suspension of 84 parts of 1-nitro-2-(4'-aminophenylamino)-5-(β-sulfatoethylsulfonyl)-benzene in 150 parts of water and is brought to a pH of 6.5 by meansof dilute aqueous sodium hydrogen carbonate solution; by gradual warming the reaction temperature is raised to 45° C. while maintaining this pH value of 6.5 and in this way a second condensation reaction is completed.

The disazo compound according to the invention is isolated in conventional manner. This gives a dark red electrolyte-containing powder of the sodium salt of the compound of the formula

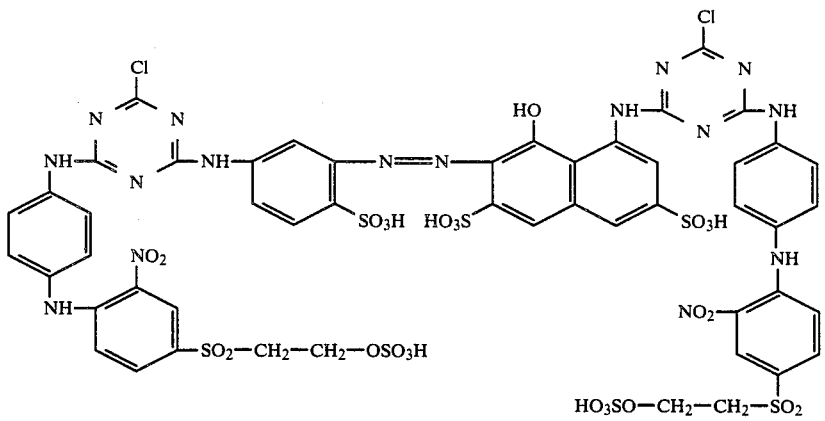

which produces strong red, fast dyeings on cotton.

EXAMPLES 44 to 47

The tabulated examples below describe further azo compounds according to the invention which conform to a general formula (C)

Z—D—N=N—K$_2$—Z  (C)

in which D corresponds to the radical of the aromatic diamino compound H$_2$N—D—NH$_2$, K$_2$ to the radical of an acylatable amino-containing coupling component H—K—NH$_2$ and Z to the fiber-reactive radical of the general formula (2a) mentioned in the description. They can be prepared in the manner according to the invention, for example analogously to the above Example 43, from the components visible in the formula and cyanuric chloride. They have very good fiber-reactive dye properties and produce on the materials mentioned in the description, such as in particular cellulose fiber materials, by the application methods customary in the industry, preferably by the application and fixing methods customary for fiber-reactive dyes, strong dyeings and prints having good fastness properties in the hue on cotton indicated in the respective tabulated example.

| Example | Aminodiphenylamine conforming to the formula (8) | Radical —D— conforming to diamine H$_2$N—D—NH$_2$ | Coupling component H—K$_2$—NH$_2$ | Hue |
|---|---|---|---|---|
| 44 | 1-Nitro-2-(4'-aminophenyl-amino)-5-(β-sulfatoethyl-sulfonyl)-benzene |  SO$_3$H | 1-Amino-8-naphthol-3,6-disulfonic acid | red |
| 45 | 1-Nitro-2-(4'-aminophenyl-amino)-5-(β-sulfatoethyl-sulfonyl)-benzene | 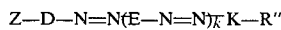 SO$_3$H | 3-Amino-8-naphthol-6-sulfonic acid | orange |
| 46 | 1-Nitro-2-(4'-aminophenyl-amino)-5-(β-sulfatoethyl-sulfonyl)-benzene | SO$_3$H | 1-Amino-8-naphthol-4,6-disulfonic acid | red |
| 47 | 1-Nitro-2-(4'-aminophenyl-amino)-5-(β-sulfatoethyl-sulfonyl)-benzene | SO$_3$H | 1-Amino-8-naphthol-4,6-disulfonic acid | red |

We claim:

1. A water-soluble azo compound which conforms to the formula

Z—D—N=N(E—N=N)$_{\overline{k}}$K—R'' wherein
Z is a group of the formula

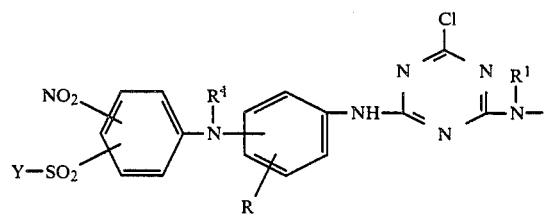

in which

R¹ is hydrogen or is alkyl of 1 to 4 carbon atoms unsubstituted or substituted by one or two substituents selected from the group consisting of acetylamino, hydroxy, sulfato, alkoxy of 1 to 4 carbon atoms, sulfo and carboxy, and both R¹ are identical to or different from each other, R is hydrogen or sulfo, and Y is vinyl, β-thiosulfatoethyl, β-phosphatoethyl, β-chloroethyl or β-sulfatoethyl;

k is zero or 1;

D is a group of the formula

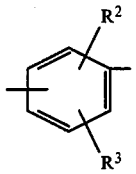

in which

R² is hydrogen, alkyl of 1 to 4 carbon atoms, alkoxy of 1 to 4 carbon atoms, chlorine or sulfo and R³ is hydrogen or sulfo and the R² and R³ are identical to or different from each other;

E is a phenylene unsubstituted or substituted by one or two substituents selected from the set consisting of 2 alkyls of 1 to 4 carbon atoms; 2 alkoxys of 1 to 4 carbon atoms; 1 chlorine; 1 bromine; 1 alkanoylamino of 2 to 5 carbon atoms, unsubstituted or substituted by substituents selected from the group consisting of chlorine, bromine, sulfo, sulfato, carboxy, hydroxy, carbomethoxy and carbethoxy; 1 benzoylamino; 1 sulfo; 1 carboxy; 1 ureido; 1 phenylureido and 1 alkylsulfonylamino of 1 to 4 carbon atoms; or is a naphthylene unsubstituted or substituted by 1 or 2 sulfo or by —SO₂Y wherein Y is said Y defined above, or by 1 sulfo and said —SO₂—Y, each said Y being identical to or different from the other Y;

R" is hydrogen or a chlorotriazinylamino group of the formula

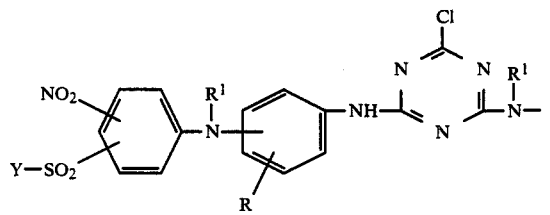

defined above;

K is, in the case where R" is the above chlorotriazinylamino group, a 1-hydroxy-naphthylene which contains the azo group bonded in the 2-position, or a 2-hydroxy-naphthylene which contains the azo group bonded in the 1-position, and which are both unsubstituted or substituted by 1 or 2 sulfo, or is a 1,4-naphthylene unsubstituted or substituted by 1 or 2 sulfo, or is a phenylene unsubstituted or substituted by 1 or 2 substituents selected from the group consisting of 2 alkyls of 1 to 4 carbon atoms; 2 alkoxys of 1 to 4 carbon atoms; 2 chlorines; 1 bromine; 1 alkanoylamino of 2 to 5 carbon atoms, unsubstituted or substituted by substituents selected from the group consisting of chlorine, bromine, sulfo, sulfato, carboxy, hydroxy, carbomethoxy and carbethoxy; 1 benzoylamino; 1 sulfo; 1 carboxy; 1 ureido; 1 phenylureido and 1 alkylsulfonylamino of 1 to 4 carbon atoms; or K—R" is, if R" is hydrogen, 1-hydroxy-naphthyl which contains the azo group bonded in the 2-position, or is 2-hydroxynaphthyl which contains the azo group bonded in the 1-position, and both are unsubstituted or substituted by 1 or 2 sulfo by an alkanoylamino of 2 to 5 carbon atoms which is unsubstituted or substituted by substituents selected from the group consisting of chlorine, bromine, sulfo, sulfato, carboxy, hydroxy, carbomethoxy and carbethoxy, or by a benzoylamino which is unsubstituted or substituted by substituents selected from the group consisting of sulfo, carboxy and methyl, or by one or two sulfo and an alkanoylamino group of 2 to 5 carbon atoms which is unsubstituted or substituted by substituents selected from the group consisting of chlorine, bromine, sulfo, sulfato, carboxy, hydroxy, carbomethoxy and carbethoxy, or a benzoylmino which is unsubstituted or substituted by substituents selected from the group consisting of sulfo, carboxy and methyl, or is a phenyl substituted by a monosubstituted or disubstituted amino whose substituents are selected from the group of substituents consisting of alkyl of 1 to 4 carbon atoms, hydroxyalkyl of 1 to 4 carbon atoms, carboxyalkyl of 2 to 5 carbon atoms, sulfoalkyl of 1 to 4 carbon atoms, sulfatoalkyl of 1 to 4 carbon atoms, cyanoalkyl of 2 to 5 carbon atoms, carbalkoxyalkyl having alkyls of 1 to 4 carbon atoms each, phenylalkyl having an alkyl of 1 to 4 carbon atoms, its phenyl being unsubstituted or substituted by substituents selected from the group consisting of methyl, ethyl, methoxy, chlorine, carboxy and sulfo, phenyl and phenyl substituted by substituents selected from the group consisting of alkyl of 1 to 4 carbon atoms, alkoxy of 1 to 4 carbon atoms, chlorine, carboxy and sulfo, and which phenyl K—R" is not additionally substituted or is additionally substituted by 1 or 2 substituents selected from the group consisting of 2 alkyls of 1 to 4 carbon atoms; 2 alkoxys of 1 to 4 carbon atoms; 2 chlorines; 1 bromine; 1 alkanoylamino of 2 to 5 carbon atoms unsubstituted or substituted by substituents selected from the group consisting of chlorine, bromine, sulfo, sulfato, carboxy, hydroxy, carbomethoxy and carbethoxy; 1 benzoylamino; 1 sulfo; 1 carboxy; 1 ureido; 1 phenylureido and 1 alkylsulfonylamino of 1 to 4 carbon atoms.

2. A compound according to claim 1, in which E is 1,4-phenylene unsubstituted or substituted by one or two substituents selected from the set consisting of 2 alkyls of 1 to 4 carbon atoms; 2 alkoxys of 1 to 4 carbon atoms; 1 chlorine; 1 bromine; 1 alkanoylamino of 2 to 5 carbon atoms, unsubstituted or substituted by substituents selected from the group consisting of chlorine, bromine, sulfo, sulfato, carboxy, hydroxy, carbomethoxy and carbethoxy; 1 benzoylamino; 1 sulfo; 1 carboxy; 1 ureido; 1 phenylureido and 1 alkylsulfonylamino of 1 to 4 carbon atoms.

3. A compound according to claim 1, wherein K—R" is phenyl substituted in the p-position by a monosubstituted or disubstituted amino whose substituents are selected from the group consisting of alkyl of 1 to 4 carbon atoms, hydroxyalkyl of 1 to 4 carbon atoms, carboxyalkyl of 2 to 5 carbon atoms, sulfoalkyl of 1to 4 carbon atoms, sulfatoalkyl of 1 to 4 carbon atoms, cyanoalkyl or 2 to 5 carbon atoms, carbalkoxyalkyl having alkyls of 1 to 4 carbon atoms each, phenylalkyl having an alkyl of 1 to 4 carbon atoms, phenylalkyl having an alkyl of 1 to 4 carbon atoms the phenyl of which is substituted by substituents selected from the group consisting of methyl, ethyl, methoxy, ethoxy, chlorine carboxy and sulfo, phenyl and phenyl substituted by substituents selected from the group consisting of alkyl of 1 to 4 carbon atoms, alkoxy of 1 to 4 carbon atoms, chlorine, carboxy and sulfo, and said phenyl K—R" is not additionally substituted or is additionally substituted by one or two substituents from the group consisting of 2 alkyls of 1 to 4 carbon atoms; 2 alkoxys of 1 to 4 carbon atoms; 2 chlorines; 1 bromine; 1 alkanoylamino of 2 to 5 carbon atoms, unsubstituted or substituted by substituents selected from the group consisting of chlorine, bromine, sulfo, sulfato, carboxy, hydroxy, carbomethoxy and carbethoxy; 1 benzoylamino; 1 sulfo; 1 carboxy; 1 ureido; 1 phenylureido and 1 alkylsulfonylamino of 1 to 4 carbon atoms.

* * * * *

UNITED STATES PATENT AND TRADEMARK OFFICE
CERTIFICATE OF CORRECTION

PATENT NO. : 4,703,111
DATED : October 27, 1987
INVENTOR(S) : Marcos Segal and Michael Kunze It is certified that error appears in the above-identified patent and that said Letters Patent is hereby corrected as shown below:

At column 30, line 8, --or-- is inserted between "sulfo" and "by".

Signed and Sealed this

Thirteenth Day of December, 1988

*Attest:*

DONALD J. QUIGG

*Attesting Officer*      *Commissioner of Patents and Trademarks*